United States Patent
Wilhoit et al.

(10) Patent No.: US 7,416,767 B2
(45) Date of Patent: Aug. 26, 2008

(54) ANTI-BLOCKING COATINGS FOR PVDC-COATED SUBSTRATES

(75) Inventors: Darrel Loel Wilhoit, Washougal, WA (US); John Cameron Files, Vancouver, WA (US)

(73) Assignee: Graphic Packaging International, Inc., Marietta, GA (US)

( * ) Notice: Subject to any disclaimer, the term of this patent is extended or adjusted under 35 U.S.C. 154(b) by 407 days.

(21) Appl. No.: 10/954,435

(22) Filed: Sep. 30, 2004

(65) Prior Publication Data

US 2006/0068182 A1    Mar. 30, 2006

(51) Int. Cl.
- B32B 27/08 (2006.01)
- B32B 27/10 (2006.01)
- B32B 27/30 (2006.01)
- B32B 27/36 (2006.01)

(52) U.S. Cl. .................. 428/36.7; 428/35.4; 428/36.6; 428/212; 428/213; 428/219; 428/340; 428/341; 428/342; 428/480; 428/483; 428/507; 428/511; 428/512; 428/514; 428/515; 428/520; 428/522

(58) Field of Classification Search ............... None
See application file for complete search history.

(56) References Cited

U.S. PATENT DOCUMENTS

| | | | | |
|---|---|---|---|---|
| 3,639,148 A | * | 2/1972 | Moore et al. | 428/484.1 |
| 3,753,769 A | * | 8/1973 | Steiner | 428/331 |
| 3,790,402 A | | 2/1974 | Eastes | |
| 3,876,578 A | * | 4/1975 | Takada et al. | 524/501 |
| 3,928,707 A | * | 12/1975 | Lauterbach et al. | 428/342 |
| 3,950,290 A | | 4/1976 | Drury et al. | |
| 3,988,500 A | * | 10/1976 | Jahn | 428/518 |
| 4,058,645 A | * | 11/1977 | Steiner | 428/331 |
| 4,058,649 A | * | 11/1977 | Steiner | 428/518 |
| 4,097,297 A | * | 6/1978 | Keene | 106/169.14 |
| 4,565,742 A | * | 1/1986 | Lang | 428/476.3 |
| 4,654,252 A | | 3/1987 | Doyen | |
| 4,794,136 A | | 12/1988 | Touhsaent | |
| 4,830,902 A | | 5/1989 | Plantenga et al. | |
| 4,867,844 A | | 9/1989 | Dessauer | |
| 4,873,135 A | * | 10/1989 | Wittnebel et al. | 428/192 |
| 4,902,594 A | | 2/1990 | Platzer | |
| 4,977,032 A | | 12/1990 | Grosjean | |
| 5,079,072 A | | 1/1992 | Christopherson | |
| 5,225,288 A | * | 7/1993 | Beeson et al. | 428/475.5 |
| 5,318,943 A | * | 6/1994 | Ueno et al. | 503/227 |
| 5,475,080 A | | 12/1995 | Gruber et al. | |

(Continued)

FOREIGN PATENT DOCUMENTS

DE    30 06 729 A1    9/1981

(Continued)

Primary Examiner—Vivian Chen
(74) Attorney, Agent, or Firm—Womble Carlyle Sandridge & Rice, PLLC

(57) ABSTRACT

A barrier composite having reduced blocking is disclosed. The composite may include a substrate, a barrier layer formed from polyvinylidene chloride disposed on the substrate, and an anti-blocking layer disposed on the barrier layer. The anti-blocking layer may be formed from polyvinyl alcohol, and optionally, colloidal silica, wax, or a combination thereof. Alternatively, the anti-blocking layer may be formed from a polymeric carrier material, colloidal silica, and a wax. Methods for forming such composites and for forming a roll of such composites are also disclosed.

10 Claims, 1 Drawing Sheet

U.S. PATENT DOCUMENTS

| | | |
|---|---|---|
| 5,654,039 A | 8/1997 | Wenzel et al. |
| 5,709,976 A | 1/1998 | Malhotra |
| 5,763,100 A | 6/1998 | Quick et al. |
| 5,770,301 A * | 6/1998 | Murai et al. ................. 428/213 |
| 5,773,131 A | 6/1998 | Dettling |
| 5,837,383 A | 11/1998 | Wenzel et al. |
| 5,882,768 A | 3/1999 | Claytor |
| 5,902,846 A | 5/1999 | Feret et al. |
| 5,942,320 A * | 8/1999 | Miyake et al. ............... 428/216 |
| 5,989,724 A | 11/1999 | Wittosch et al. |
| 6,054,526 A * | 4/2000 | Betremieux et al. ......... 524/802 |
| 6,066,375 A | 5/2000 | Shanton |
| 6,132,822 A | 10/2000 | Overcash et al. |
| 6,156,387 A | 12/2000 | Werres et al. |
| 6,193,831 B1 | 2/2001 | Overcash et al. |
| 6,218,024 B1 | 4/2001 | Tamber et al. |
| 6,383,716 B1 * | 5/2002 | Oyoshi et al. ............ 430/281.1 |
| 6,852,399 B2 | 2/2005 | Takahashi et al. |
| 6,929,013 B2 * | 8/2005 | Ashcraft et al. ............. 131/365 |
| 6,942,907 B2 * | 9/2005 | Masuda et al. ........... 428/32.79 |
| 6,982,119 B2 * | 1/2006 | Shi et al. .................... 428/413 |
| 2003/0157354 A1 * | 8/2003 | Van Veghel et al. ......... 428/515 |
| 2004/0091585 A1 | 5/2004 | Theisen et al. |
| 2004/0105942 A1 | 6/2004 | Cable |
| 2006/0068182 A1 | 3/2006 | Wilhoit et al. |
| 2006/0068212 A1 * | 3/2006 | Wilhoit et al. .............. 428/507 |

FOREIGN PATENT DOCUMENTS

| | | | |
|---|---|---|---|
| EP | 0 466 124 | * | 1/1992 |
| EP | 1 279 768 A2 | | 1/2003 |
| GB | 1 310 933 | | 3/1973 |
| GB | 2 060 655 | * | 5/1981 |
| JP | 50-063021 | * | 5/1975 |
| JP | 56-053069 | * | 5/1981 |
| JP | 56-089552 | * | 7/1981 |
| JP | 58145734 | | 8/1983 |
| JP | 04-270650 | * | 9/1992 |
| JP | 08-027398 | * | 1/1996 |
| JP | 08-134406 | | 5/1996 |
| JP | 09-291250 | * | 11/1997 |
| WO | WO 97/15436 | | 5/1997 |
| WO | WO 2005/023945 A2 | | 3/2005 |

* cited by examiner

ANTI-BLOCKING COATINGS FOR PVDC-COATED SUBSTRATES

FIELD OF THE INVENTION

This invention relates to multilayer composites suitable for use in packaging materials for various moisture and/or oxygen sensitive products, including food products, and methods of making such composites.

BACKGROUND OF THE INVENTION

Aqueous latexes of polyvinylidene chloride (PVdC) have been used to form moisture and oxygen barrier coatings for many years. In a typical coating process, the PVdC latex is coated onto paper, film, and other substrates to yield cost-effective packaging constructions with excellent barrier properties. During the application process, the PVdC is first coated onto the substrate and then dried by being exposed to infrared radiation, hot air, or a combination thereof. Often, two layers of PVdC are applied to the substrate to improve the barrier properties of the resulting composite.

The composite is typically wound into a roll for later processing. A major drawback with the presently available PVdC coating processes is that, under certain circumstances, the PVdC tends to adhere to the uncoated side of the substrate. Thus, the composite is prone to blocking when the roll is unwound.

While not wishing to be bound by theory, there are several factors that might contribute to this blocking effect. First, there is often a chemical affinity between the PVdC and the uncoated side of the substrate to which it is applied, so that the PVdC tends to adhere to the substrate when the composite is wound into a roll. Next, any residual moisture resulting from the coating process can cause the layers to adhere to one another. Further, the crystallinity of PVdC, which is a function of the temperature and time, has been shown to impact the degree of blocking. PVdC adherence to the uncoated side of the substrate tends to diminish as the degree of crystallinity increases. However, the minimal application of heat to the PVdC barrier material during the drying process does not sufficiently drive the degree of crystallinity to a level at which no blocking occurs. Additionally, the tension used during the winding process can impact blocking in the composite. The greater the tension, the more tightly wound the layers of the composite are forced against each other. Surface rewinders, which have primary and secondary arms that force the composite roll tightly against a winder drum, result in greater compression in the composite roll. Such compression also contributes to blocking. In some instances, such materials can successfully be wound on surface winders by carefully setting the winding speed, tension, and so forth. However, lack of repeatability and inconsistent product quality continue to present challenges. Center winders with taper tension winding control are more suited to wind rolls of the composite at low tension, but blocking may still occur.

Thus, there remains a need for a method of forming a PVdC coated substrate and a roll of such substrate that is not prone to blocking.

SUMMARY OF THE INVENTION

The present invention relates to anti-blocking coatings for barrier materials and composites, anti-blocking barrier materials and composites, rolls of such barrier materials and composites, and methods for forming such materials and composites and rolls thereof.

According to one aspect of the present invention, a barrier composite having reduced blocking includes a substrate, a barrier layer formed from polyvinylidene chloride disposed on the substrate, and an anti-blocking layer disposed on the barrier layer. In some instances, the substrate may be a coated paper, uncoated paper, film, or any combination thereof. The anti-blocking layer may be formed from polyvinyl alcohol, and optionally, colloidal silica, wax, or a combination thereof. Alternatively, the anti-blocking layer may be formed from a polymeric carrier material, colloidal silica, and a wax.

According to another aspect of the present invention, a barrier composite includes a substrate, a barrier layer formed from polyvinylidene chloride disposed on the substrate, and an anti-blocking layer formed from polyvinyl alcohol disposed on the barrier layer. The ratio of the weight of the anti-blocking layer to the weight of the barrier layer (per unit area) may be from about 0.1 to about 0.4 on a dry/dry basis. The anti-blocking layer may further include colloidal silica, a wax, or a combination thereof.

In another aspect of the present invention, a barrier composite having reduced blocking includes a substrate, a barrier layer formed from polyvinylidene chloride disposed on the substrate, and an anti-blocking layer formed from a polymeric material, colloidal silica, and a wax disposed on the barrier layer. The ratio of the weight of the anti-blocking layer to the weight of the barrier layer (per unit area) may be from about 0.1 to about 0.4 on a dry/dry basis. Additionally, the polymeric material may include polyvinylidene chloride or an acrylic polymer, such as a styrene-acrylic polymer or an ethylene acrylic acid polymer.

According to yet another aspect of the present invention, a barrier material having reduced blocking includes a polyethylene terephthalate substrate, a polyvinylidene chloride layer deposited on the substrate, and an anti-blocking layer deposited on the polyvinylidene chloride layer. The anti-blocking layer may include:

(i) polyvinyl alcohol;
(ii) polyvinyl alcohol, a wax, and colloidal silica;
(iii) polyvinylidene chloride, a wax, and colloidal silica;
(iv) a styrene-acrylic polymer, a wax, and colloidal silica;
(v) an ethylene acrylic acid polymer, a wax, and colloidal silica; or
(vi) any combination thereof.

The present invention also contemplates a method of forming a barrier composite having reduced blocking. The method includes providing a substrate, applying polyvinylidene chloride to the substrate, and applying an anti-blocking layer to the polyvinylidene chloride to form a composite. The anti-blocking layer may include:

(i) polyvinyl alcohol;
(ii) polyvinyl alcohol and from about 0.25 to about 8 parts dry colloidal silica per 100 parts dry polyvinyl alcohol;
(iii) polyvinylidene chloride, from about 0.25 to about 5 parts dry wax per 100 parts dry polyvinylidene chloride, and from about 0.25 to about 8 parts dry colloidal silica per 100 parts dry polyvinylidene chloride;
(iv) a styrene-acrylic polymer, from about 0.25 to about 5 parts dry wax per 100 parts dry styrene-acrylic polymer, and from about 0.25 to about 8 parts dry colloidal silica per 100 parts dry styrene-acrylic polymer,
(v) an ethylene acrylic acid polymer, from about 0.25 to about 5 parts dry wax per 100 parts dry ethylene acrylic acid polymer, and from about 0.25 to about 8 parts dry colloidal silica per 100 parts dry ethylene acrylic acid polymer, or
(vi) any combination thereof.

The present invention also encompasses a method of forming a roll of a barrier composite having reduced blocking. The method includes providing a substrate having a first side and a second side, applying a layer of polyvinylidene chloride to the first side, applying an anti-blocking layer to the polyvinylidene chloride layer to form a composite, and winding the composite into a roll such that the anti-blocking layer comes into contact with the second side of the substrate. The anti-blocking layer may include:

(i) polyvinyl alcohol;

(ii) polyvinyl alcohol and from about 0.25 to about 8 parts dry colloidal silica per 100 parts dry polyvinyl alcohol;

(iii) polyvinylidene chloride, from about 0.25 to about 5 parts dry wax per 100 parts dry polyvinylidene chloride, and from about 0.25 to about 8 parts dry colloidal silica per 100 parts dry polyvinylidene chloride;

(iv) a styrene-acrylic polymer, from about 0.25 to about 5 parts dry wax per 100 parts dry styrene-acrylic polymer, and from about 0.25 to about 8 parts dry colloidal silica per 100 parts dry styrene- acrylic polymer, (v) an ethylene acrylic acid polymer, from about 0.25 to about 5 parts dry wax per 100 parts dry ethylene acrylic acid polymer, and from about 0.25 to about 8 parts dry colloidal silica per 100 parts dry ethylene acrylic acid polymer, or (vi) any combination thereof.

DETAILED DESCRIPTION OF THE INVENTION

Figure 1:
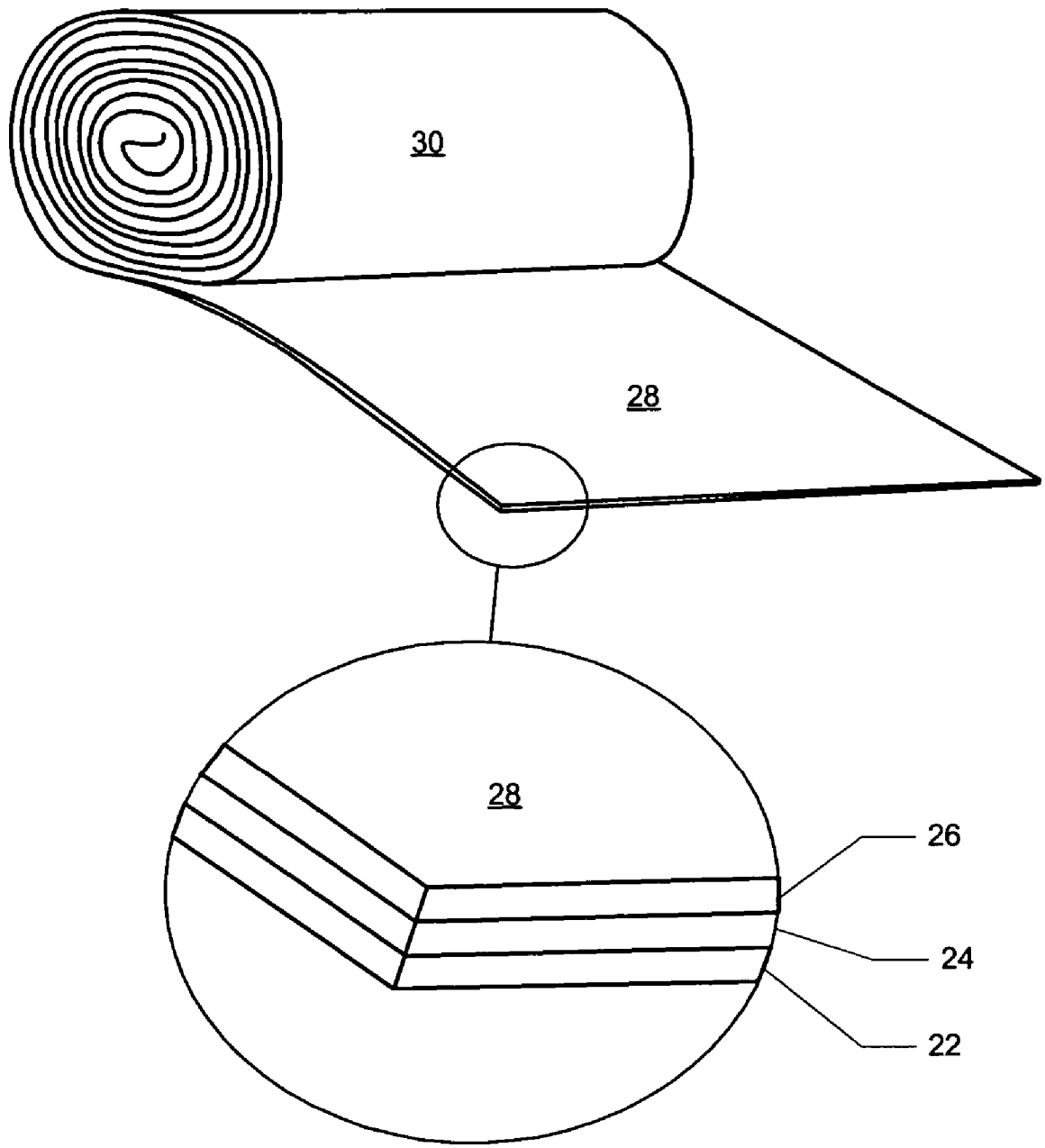
FIG. 1 depicts an exemplary composite partially wound into a roll according to the present invention.

The present invention is directed in part to a barrier composite having reduced blocking properties (also termed an "anti-blocking barrier composite"). As shown in FIG. 1, the composite 20 comprises a substrate 22, a barrier layer 24 disposed thereon, and an anti-blocking layer 26 disposed on the barrier layer 24.

Typically, PVdC coated substrates are wound into a roll for transportation and further processing. However, presently available PVdC coated substrates are prone to blocking, so that upon unwinding the roll, the composite wrinkles, tears, or becomes otherwise damaged. The present invention overcomes this obstacle by applying an anti-blocking coating over the PVdC to form an anti-blocking layer. The anti-blocking layer 26 is provided so that when the composite 20 is wound into a roll, and the exposed surface 28 of layer 26 is brought into contact with the exposed surface 30 of layer 22, the composite will not stick to itself or "block" and will be readily unwound without tearing or otherwise damaging the composite 20. Furthermore, by providing a barrier layer that is separate from the anti-blocking layer, and therefore free of anti-blocking additives, the properties of the barrier layer are not compromised. In addition, by selecting anti-blocking layer components that also provide barrier properties to form the anti-blocking layer, the barrier properties of the composite can be enhanced.

Returning to FIG. 1, the substrate 22 is typically a coated or uncoated paper, a film, or combination thereof. As used herein, "film" refers to a thin, continuous sheet of a substance or combination of substances, including, but not limited to, thermoplastic materials. Exemplary films for use in packaging materials include, but are not limited to, polyethylene terephthalate, polyethylene, or polypropylene. While such materials are described herein, it should be understood that other suitable materials may be used as desired.

The barrier layer 24 may typically be formed from polyvinylidene chloride (PVdC). Generally, PVdC is a transparent and almost colorless thermoplastic noted for its extremely low permeability to gases. In the field of food product packaging, PVdC is often used to prevent the transmission of oxygen into the package, which causes spoilage, and to prevent the transmission of desirable odors and flavors from the package. PVdC is formed by polymerizing vinylidene chloride with about 10 to about 20 weight % monomers such as acrylic esters and unsaturated carboxyl groups. One commercially available PVdC that may be suitable for use with the present invention is DARAN 8730 from W. R. Grace (Columbia, Md.). DARAN 8730 is provided as a latex having about 53 weight % non-volatiles (NV). However, it should be understood that other barrier materials are contemplated by the present invention.

In this and other aspects of the present invention, the barrier layer may be present in any suitable amount as required by a given application. In some instances, the ratio of the weight of the barrier layer to the weight of the substrate (each measured herein on a per unit area basis) may be from about 0.1 to about 0.4 on a dry/dry basis. In other instances, the ratio of the weight of the barrier layer to the weight of the substrate may be from about 0.2 to about 0.4 on a dry/dry basis. In yet other instances, the ratio of the weight of the barrier layer to the weight of the substrate may be about 0.25 on a dry/dry basis. While various ranges and amounts are described in detail herein, it should be understood that other ranges and amounts not expressed herein are contemplated by the present invention.

Any material or combination of materials may be used to form the anti-blocking layer 26, provided that the resulting anti-blocking layer has a chemical affinity to the PVdC layer 24, but not to the substrate 22. Additionally, the material should be readily capable of forming a continuous film.

In one aspect of the present invention, the anti-blocking layer may be formed from polyvinyl alcohol. Examples of polyvinyl alcohols that may be suitable for use with the present invention include, but are not limited to, CELVOL 540 and CELVOL 203, commercially available from Celanese Dallas, Tex.), and ELVANOL 51-05, commercially available from DuPont (Wilmington, Del.). As will be discussed further herein, polyvinyl alcohol successfully forms an anti-blocking layer to prevent the composite from blocking as the roll is unwound.

If desired, the polyvinyl alcohol anti-blocking layer may include colloidal silica, a wax, or a combination thereof. As used herein, "colloidal" refers to a substance including very tiny particles that are usually between 1 nanometer and 1000 nanometers in diameter. As used herein, a "colloidal dispersion" refers to a system in which particles of colloidal size are dispersed in a continuous medium, such as a liquid, solid, or gas. As used herein, a "wax" refers to a low-melting organic mixture or compound of high molecular weight hydrocarbons, esters of fatty acids, and esters of alcohols that are solids at room temperature and generally similar in composition to fats and oils, except that no glycerides are present. While not wishing to be bound by theory, it is believed that the colloidal silica and wax migrate to the surface of the anti-blocking layer to create a "non-stick" layer. When the composite is wound into a roll, the non-stick surface of the anti-blocking layer is in contact with the substrate, thereby preventing the composite from blocking as the roll is unwound.

Thus, in one variation of this aspect, the anti-blocking barrier composite 20 may include a substrate 22, a barrier layer 24 formed from polyvinylidene chloride, and an anti-blocking layer 26 formed from polyvinyl alcohol and colloidal silica. In another variation, the anti-blocking barrier composite 20 may include a substrate 22, a barrier layer 24 formed from polyvinylidene chloride, and an anti-blocking layer 26 formed from polyvinyl alcohol, colloidal silica, and a wax.

The relative proportions of the components in the anti-blocking layer may vary for a given application. In some instances, for 100 parts of dry polyvinyl alcohol, the anti-blocking layer may include from about 0.25 to about 8 parts dry colloidal silica. In other instances, the anti-blocking layer may include from about 0.5 to about 4 parts dry colloidal silica per 100 parts of dry polyvinyl alcohol. In yet other instances, the anti-blocking layer may include about 1 part dry colloidal silica per 100 parts of dry polyvinyl alcohol.

If desired, the colloidal silica may be provided in the form of a colloidal silica dispersion. Such colloidal silica dispersions may be provided with any solids content, for example, from about 40 to about 60 weight % colloidal silica. One such colloidal silica is LUDOX TM-50, commercially available from Grace Davison (Columbia, Md.), provided as an about 50 weight % NV dispersion.

In general, any suitable wax may be selected for use with the present invention. Suitable waxes may generally be characterized as having a sufficient chemical affinity for the material into which it is mixed to provide a stable composition, and a sufficiently low affinity for the substrate material to prevent blocking when the composite is wound into a roll. Further, such waxes do not substantially inhibit the ability of other chemicals, for example, adhesives, inks, and so forth, to adhere to the anti-blocking layer. One wax that may be suitable for use with the present invention is Carnauba wax. As used herein, "Carnauba wax" refers to the hard wax derived from the leaves of the Carnauba Palm, *Copernicia prunifera*. One example of a Carnauba wax that may be suitable for use with the present invention is MICHELMAN 160, commercially available from Michelman, Inc. (Cincinnati, Ohio). MICHELMAN 160 is provided as a 25 weight % NV emulsion.

The anti-blocking layer composition may typically be formed by mixing the diluting the polyvinyl alcohol with water as needed, followed by adding the wax and/or colloidal silica to the diluted polymer. The wet anti-blocking layer composition is generally applied in an amount needed to substantially coat the barrier layer.

In this and other aspects, the anti-blocking layer may be present in any suitable amount as required by a given application. In some instances, the ratio of the weight of the anti-blocking layer to the weight of the barrier layer (each measured herein on a per unit area basis) may be from about 0.1 to about 0.4 on a dry/dry basis. In other instances, the ratio of the weight of the anti-blocking layer to the weight of the barrier layer may be from about 0.2 to about 0.3 on a dry/dry basis. In yet other instances, the ratio of the weight of the anti-blocking layer to the weight of the barrier layer may be about 0.25 on a dry/dry basis. While various ranges and amounts are described in detail herein, it should be understood that other ranges and amounts not expressed herein are contemplated by the present invention.

According to another aspect of the present invention, the anti-blocking layer may be formed from a polymeric material, colloidal silica, and a wax. In this aspect, the polymeric material is used primarily as a carrier for the active anti-blocking components, namely, the colloidal silica and wax. As stated above, it is believed that the colloidal silica and wax migrate to the surface of the anti-blocking layer to create a "non-stick" surface. It is further believed that the application of heat to the composite during the formation process can facilitate the migration, or "blooming", of the silica and wax to the surface of the anti-blocking layer. When the composite is wound into a roll, the non-stick surface prevents the composite from blocking as the roll is unwound.

The carrier may be any polymeric material that has a chemical affinity for PVdC, yet when augmented by small quantities of silica and/or wax, does not have an affinity for the substrate material. Further, the polymeric material must be capable of forming a continuous film.

In accordance with the present invention, the polymeric material may be polyvinylidene chloride (PVd). As discussed above, PVdC tends to adhere strongly to the uncoated side of a substrate, such as, for example, polyethylene terephthalate film. However, when PVdC is combined with small quantities of silica and wax, the composition forms a highly effective anti-blocking layer. As stated previously, it is believed that the silica and wax in the anti-blocking layer migrate to the surface of the PVdC carrier in the anti-blocking layer and prevent the PVdC from contacting, and therefore, adhering to the uncoated side of the substrate. One example of a PVdC material that may be suitable as a carrier is DARAN 8730 PVdC latex (53% NV), commercially available from W. R. Grace (Columbia, Md.). Other PVdC materials are commercially available and are contemplated hereby.

In another aspect of the present invention, the polymeric material may be an acrylic polymer, for example, a styrene-acrylic polymer or an ethylene acrylic acid polymer. Examples of acrylic polymers that may be suitable carriers include, but are not limited to, JONCRYL DFC 3030 acrylic emulsion (47.4 weight % NV), commercially available from Johnson Polymer (Sturtevant, Wis.), and MICHEM PRIME 4983-40R ethylene acrylic acid emulsion (40 weight % NV), commercially available from Michelman, Inc. (Cincinnati, Ohio).

As discussed previously, the colloidal silica may be provided in any suitable manner, for example, as a dispersion having, for example, about 50 weight % colloidal silica. The wax may be any suitable wax, and in some instances, may be a Carnauba wax. One example of a wax emulsion that may be suitable for use with the present invention is Michelman 160, described in detail above.

The relative proportions of the components in the anti-blocking layer may vary for a given application.

In some instances, for 100 parts of dry polymeric carrier material, the anti-blocking layer may include from about 0.25 to about 8 parts dry colloidal silica. In other instances, the anti-blocking layer may include from about 0.5 to about 4 parts dry colloidal silica per 100 parts of dry polymeric carrier material. In yet other instances, the anti-blocking layer may include about 1 part dry colloidal silica per 100 parts of dry polymeric carrier material.

In some instances, for 100 parts of dry polymeric carrier material, the anti-blocking layer may include from about 0.25 to about 5 parts dry wax. In other instances, the anti-blocking layer may include from about 0.5 to about 3 parts dry wax per 100 parts of dry polymeric carrier material. In yet other instances, the anti-blocking layer may include about 1 part dry wax per 100 parts of dry polymeric carrier material.

In this and other aspects of the present invention, the composition may be formed by diluting the polymeric carrier material with water as needed, followed by adding the wax and colloidal silica. Typically, the polymeric carrier material may be diluted to a composition containing from about 15 to about 30 weight % NV. A small amount of isopropyl alcohol (e.g., about 1 to about 5 weight %), surfactants, anti-foaming agents, and the like may also be added if needed.

The present invention also contemplates a method of forming a barrier composite having reduced blocking. The method comprises providing a substrate, applying to the substrate a barrier layer, for example, polyvinylidene chloride, and applying an anti-blocking layer to the barrier layer to form a composite having a barrier layer and an anti-blocking layer. The details of an exemplary process are provided below. However, it should be understood that other means of preparing the composite are contemplated by the present invention.

As stated previously, the substrate may be, for example, a coated paper, an uncoated paper, a film, or any combination thereof. For example, the substrate may be polyethylene terephthalate film. The substrate is typically provided in a roll and unwound using traditional roll handling equipment. The substrate includes a first side and a second side.

At a first coating station, a barrier coating is applied to the first side of the substrate to form a barrier layer. The barrier layer may be formed from any material that suitably minimizes the transmission of water, air, and other vapors therethrough as required by a particular application. For instance, the barrier layer may include PVdC The barrier layer may be applied to the substrate using any suitable application equipment or technique, including but not limited to, Gravure printing, roll coating and air knife, brush treating, spraying, dipping, wire wound rods, and so forth.

The barrier coating may be applied as an solution, dispersion, or emulsion. The barrier coating may be diluted, for example, with water, if needed to achieve the desired coating uniformity and to apply the desired coat weight. In some instances, the barrier layer may be applied as an aqueous coating having from about 20 to about 60 weight % NV. In other instances, the barrier layer may be applied as an aqueous coating having from about 30 to about 55 weight % NV. In yet other instances, the barrier layer may be applied as an aqueous coating having from about 40 to about 53 weight % NV.

The wet barrier coating on the first side of the substrate may then dried by passing the coated substrate through a hot air impingement dryer or other suitable dryer. Typically, the barrier layer is substantially dried, i.e., sufficiently dried and solidified to enable another coating to be applied thereon without compromising the integrity of the barrier layer. However, it should be understood that in some instances, it may be suitable to prepare the composite without drying the barrier layer. For instance, the barrier layer may be formed by extrusion, aerosols, or other high-solids processes.

The dryer temperature is adjusted to impart sufficient thermal energy to the coating to substantially evaporate the water, or other diluent, from the coating and obtain a substantially solid film. Additionally, the dryer temperature must be maintained at a temperature that will not cause the substrate to deform. For example, where the substrate is polyethylene terephthalate film, which has a softening point of about 200° F., the temperature of the dryer air may be maintained at from about 210° F. to about 225° F., for example at 215° F., to achieve a web temperature of from about 180° F. to about 200° F. Where the substrate is paper, the dryer air temperature may be maintained at from about 250° F. to about 400° F., for example at 300° F., to achieve a web temperature of from about 200° F. to about 250° F. The fan pressure may be maintained at from about 1 to about 2 inches $H_2O$, which corresponds to an air velocity of from about 4500 to about 6500 feet per minute. The residence time within the dryer depends on the length of the dryer and the line speed at which the coated substrate is prepared. For example, where the dryer is about 60 feet in length and the line speed ranges from about 500 feet per min to about 1000 feet per min, the residence time within the dryer may be from about 7.2 to about 3.6 seconds, respectively. Other residence times are contemplated by the present invention.

At a second coating station, an anti-blocking coating is applied to the barrier layer to form an anti-blocking layer. According to some aspects, the anti-blocking coating may include:

(i) polyvinyl alcohol;
(ii) polyvinyl alcohol, a wax, and colloidal silica;
(iii) polyvinylidene chloride, a wax, and colloidal silica;
(iv) a styrene-acrylic polymer, a wax, and colloidal silica;
(v) an ethylene acrylic acid polymer, a wax, and colloidal silica; or
(vi) any combination thereof. The anti-blocking layer is generally applied to the barrier layer as an solution, dispersion, or emulsion.

The anti-blocking coating may be applied to the barrier layer using any suitable application equipment or technique, including but not limited to, Gravure printing, roll coating and air knife, brush treating, spraying, dipping, wire wound rods, and so forth.

The anti-blocking coating may then be dried by passing the composite through a hot air impingement dryer or other suitable dryer. Typically, the anti-blocking coating is substantially dried, i.e., sufficiently dried and solidified to permit the composite to be wound into a roll without compromising the integrity of the various layers of the composite. However, it should be understood that in some instances, it may be suitable to prepare the composite without drying. For example, the anti-blocking layer may be formed by extrusion, aerosols, or other high-solids processes.

As above, the dryer temperature is adjusted to impart sufficient thermal energy to the anti-blocking coating to substantially evaporate the water, or other diluent, and obtain a substantially solid film. Additionally, the dryer air temperature must be maintained at a temperature that will not cause the substrate to deform. For example, where the substrate is polyethylene terephthalate film, which has a softening point of about 200° F., the temperature of the dryer air may be maintained at from about 210° F. to about 225° F., for example at 215° F., to achieve a web temperature of from about 180° F. to about 200° F. Where the substrate is paper, the dryer air temperature may be maintained at from about 250° F. to about 400° F., for example at 300° F., to achieve a web temperature of from about 200° F. to about 250° F. The fan pressure may be maintained at from about 1 to about 2 inches $H_2O$, which corresponds to an air velocity of from about 4500 to about 6500 feet per minute. The residence time within the dryer depends on the length of the dryer and the line speed at which the composite is prepared. For example, where the dryer is about 20 feet in length and the line speed ranges from about 500 feet per min to about 1000 feet per min, the residence time within the dryer may be from about 2.4 to about 1.2 seconds, respectively. Other residence times are contemplated by the present invention.

If desired, the resulting composite may be wound into a roll using a surface winder, center winder, or other suitable winding equipment. Advantageously, the anti-blocking barrier composite of the present invention is readily wound and unwound on both surface winders and center winders without blocking. Thus, the present invention enables greater flexibility in equipment selection and processing speeds.

The present invention is further illustrated by the following examples, which are not to be construed in any way as imposing limitations upon the scope thereof. On the contrary, it is to be clearly understood that resort may be had to various other aspects, modifications, and equivalents thereof which, after reading the description herein, may be suggested to one of ordinary skill in the art without departing from the spirit of the present invention or the scope of the appended claims.

TEST METHODS

All measurements of water vapor transmission rate (WVTR) were made using ASTM F 1249-90 (Reapproved 1995) titled "Water Vapor Transmission Rate Through Plastic Film and Sheeting Using a Modulated Infrared Sensor", incorporated by reference herein in its entirety.

All measurements of oxygen transmission rate (OTR) were made using ASTM F 1927-98 titled "Determination of Oxygen Gas Transmission Rate, Permeability and Permeance at Controlled Relative Humidity Through Barrier Materials Using a Coulometric Detector", incorporated by reference herein in its entirety.

EXAMPLES 1-8

Various barrier composites were prepared to evaluate anti-blocking characteristics. The composites were prepared on laboratory equipment.

Polyethylene terephthalate film having a thickness of about 0.0005 in. was coated with an aqueous emulsion of DARAN 8730 PVdC having about 53 weight % NV. Aqueous isopropyl alcohol (70 weight %) was added to the PVdC dispersion at a level of about 4% to improve uniformity of the coating. The final concentration of the combined emulsion and isopropyl alcohol was about 51 weight % NV. A no. 8 Mayer rod was used to apply the latex to the substrate. The PVdC coated substrate was then dried at about 40° F. for about 1 min. in a Fisher Scientific Iso Therm oven. The resulting PVdC was present in an amount of about 5 lb/ream on a dry/dry basis.

It should be noted that the conditions used to dry the barrier layer are not typically used. The barrier layer was dried in this manner to cause blocking, so the benefits of the various potential anti-blocking materials would be more readily apparent.

Next, various anti-blocking layer compositions were applied to the barrier layer using a no. 5 Mayer rod as provided in Table 1. Other minor components, such as anti-foaming agents or surfactants were added at negligible levels as needed. The anti-blocking layer was dried in a Fisher Scientific Iso Therm oven maintained at a temperature of about 40° C. for about 1 minute.

TABLE 1

| Example | Composition of Anti-Blocking Layer |
|---|---|
| 1 | None (only PET substrate coated with PVdC barrier layer) |
| 2 | SL112 PVdC (25% NV) 2% LUDOX TM-50 colloidal silica 2% MICHEMLUBE 160 wax emulsion |
| 3 | DFC3030 Lacquer (20% NV) 2% LUDOX TM-50 colloidal silica 1% MICHEMLUBE 160 wax emulsion |
| 4 | CELVOL 203 PVOH (16% NV) 1% LUDOX TM-50 colloidal silica |
| 5 | 4983-40R MICHEM PRIME (20% NV) 2% LUDOX TM-50 colloidal silica 1% MICHEMLUBE 160 wax emulsion |
| 6 | DARAN 8730 PVdC (16% NV) 2% LUDOX TM-50 colloidal silica 2% MICHEMLUBE 160 wax emulsion |
| 7 | CELVOL 540 PVOH (5.5% NV) |
| 8 | ELVANOL 51-05 PVOH (15% NV) |

The weight percentages expressed in Table 1 refer to the wet weight percent of NV in the coating after the as-received material has been diluted. Replicates were made of each composite, placed on top of one another front to back, and pressed together using steel plates at 10.4 psi. After at least about 24 hours, the weights were removed. The anti-blocking effectiveness was measured subjectively by listening to the sound made when the composite samples were separated and by the force required to separate the samples. The samples were evaluated as set forth in Table 2.

TABLE 2

| Designation | Composite Properties |
|---|---|
| No blocking | No blocking detected |
| Very slight ticking | Barely perceptible sound created when the composites are pulled apart |
| Slight ticking | Perceptible sound created when the composites are separated |
| Slight blocking | Ticking is noticeable and slight but perceptible force can be felt when composites are separated |
| Blocking | Perceptible force can be felt when the composites are separated |
| Moderate blocking | Notable force needed to pull the composites apart |
| Severe blocking | The composites are so adhered to each other that the composites tear when pulled apart |

The results are presented in Table 3.

TABLE 3

| Example | Composition of Anti-Blocking Coating | Results |
|---|---|---|
| 1 | None | Severe blocking |
| 2 | SL112 PVdC (25% NV) 2% LUDOX TM-50 colloidal silica 2% MICHEMLUBE 160 wax emulsion | Severe blocking |
| 3 | JONCRYL DFC3030 acrylic lacquer (20% NV) 2% LUDOX TM-50 colloidal silica 1% MICHEMLUBE 160 wax emulsion | No blocking |
| 4 | CELVOL 203 PVOH (16% NV) 1% LUDOX TM-50 colloidal silica | No blocking |
| 5 | 4983-40R MICHEM PRIME (20% NV) 2% LUDOX TM-50 colloidal silica 1% MICHEMLUBE 160 wax emulsion | Very slight ticking |
| 6 | DARAN 8730 PVdC (16% NV) 2% LUDOX TM-50 colloidal silica 2% MICHEMLUBE 160 wax emulsion | No blocking |
| 7 | CELVOL 540 PVOH (5.5% NV) | No blocking |
| 8 | ELVANOL 51-05 PVOH (15% NV) | No blocking |

As expected, the samples used in Example 1 exhibited severe blocking. The samples consisted of a PET substrate coated only with PVdC barrier layer. The coated PET film samples were not able to be separated without tearing. This control example represents what occurs when a PET substrate coated with PVdC barrier layer is wound into a roll, as depicted in FIG. 1.

The samples used in Example 2 also exhibited severe blocking. While not wishing to be bound by theory, this is likely due to the fact that the anti-blocking layer composition was not able to form a continuous film at 25 wet weight % NV. It is believed that at a concentration of 50 wet weight % or greater, the SL112 would form a continuous film and provide the desired anti-blocking properties. However, this was not evaluated because other PVdC compositions, for example, DARAN 8730 PVdC, were available and successfully formed a continuous film at concentrations as low as 13 wet weight % NV (see EXAMPLE 19).

The samples used in Example 3 exhibited no blocking. JONCRYL DFC 3030 is a styrene-acrylic lacquer provided as a 47.4 weight % NV emulsion. It was applied as an emulsion having about 20 weight % NV. A small amount of surfactants, anti-foaming agents, and the like may have been added to decrease the surface tension of the composition and improve coating lay-down. Although lower concentrations of JON-CRYL DFC 3030 were not evaluated, it is believed that lower concentrations would also produce the desired result, provided that a continuous film can be obtained.

The samples used in Example 4 also exhibited no blocking. Although other concentrations of CELVOL 203 PVOH were not evaluated, it is believed that other concentrations would also produce the desired result. The PVOH polymer dried into a clear, continuous film and successfully adhered to the PVdC layer while repelling the PET substrate. No additives, such as colloidal silica or wax, were required to achieve this result.

The samples used in Example 5 exhibited very slight ticking when the samples were separated. MICHEM PRIME 4983-40R is a 40 weight % emulsion of ethylene acrylic acid (EAA) in water. It produced good anti-blocking properties when dried from a 20 weight % NV emulsion. In this instance, the ethylene acrylic acid polymer acts merely as a carrier material for the active anti-blocking components, namely, the colloidal silica and wax. Although other concentrations of MICHEM PRIME 4983-40R were not evaluated, it is believed that lower concentrations would also produce the desired result.

The samples used in Example 6 exhibited no blocking. Daran 8730 PVdC emulsion provided as a 53 wet weight % NV emulsion. It was applied at a concentration of 16 wet weight % NV. In this instance, the PVdC polymer in the anti-blocking layer acts merely as a carrier material for the active anti-blocking components, namely, the colloidal silica and wax. Lower concentrations of 8730, for example, 13 wet weight % NV, were evaluated, and found to give satisfactory anti-blocking properties (see EXAMPLE 19).

The samples used in Examples 7 and 8 exhibited no blocking. The PVOH polymer dried into a clear, continuous film and successfully adhered to the PVdC layer while repelling the PET substrate. No additives, such as colloidal silica or wax, were required to achieve this result.

EXAMPLE 9

A roll of anti-blocking barrier material was prepared using a continuous process to determine whether a line speed of about 500 feet per minute (fpm) could successfully be used to apply the anti-blocking layer.

A control coated sample, sample 9A, was made at 500 fpm without an anti-blocking layer. A 280 cell count gravure roll was used on a C&L coater to apply the first layer of PVdC, which was dried in the 60 foot Ross dryer at an air temperature of about 200° F.

A second layer of PVdC was applied using a 180 cell count gravure roll, but that contained no anti-blocking agents. The second coat was dried in a 20 ft long dryer operated at an air temperature of about 194° F. Care was taken to ensure that no wrinkles were created and that the edges of the roll were not dished or telescoped. A 16,500 foot roll was successfully coated at about 500 fpm. The total coat weight applied was about 1.8 lb/ream. The WVTR/OTR values were 0.876 and 1.252, respectively. Notably, excessive blocking occurred when the roll was unwound.

To form Sample 9B, a 180 cell count reverse gravure roll on a C&L coater was used to apply a PVdC 8730 emulsion having about 53 wet weight % NV to a polyethylene terephthalate substrate. The barrier layer on the substrate was then dried in a Ross dryer maintained at a temperature of about 215° F. The resulting PVdC was thus present in an amount of 1.1 lb/ream on a dry/dry basis.

The anti-blocking coating was then applied to the barrier layer using a 280 cell count gravure roll. The coating included about 15 wet weight % NV PVdC, about 2 wet weight % Michemlube 160 wax (based on the wet weight of the coating), and about 2 wet weight % Ludox TM-50 colloidal silica (based on the wet weight of the coating was applied. The anti-blocking coating was then dried in a TEC dryer maintained at an air temperature of about 215° F. Care was taken to ensure that no wrinkles were created and that the edges of the roll were not dished or telescoped. A 50,000 foot roll was successfully coated at about 500 fpm.

The composite with the anti-blocking layer, Sample 9B, had a WVTR of about 0.4 g/100 in$^2$/24 hours and an OTR of about 0.55 cm$^3$ O$_2$/100 in$^2$/24 hours. Thus, even though the second layer contained only about 15 wet weight % of PVdC (about 0.2 dry lb/ream), it contributed to the barrier properties of the composite. This is an unexpected result, as PVdC coatings from compositions having less than about 46 wet weight % NV are not expected to form continuous films, and therefore, are not expected to provide significant barrier properties per unit thickness of coating compared to coatings of compositions having over 46 wet weight % NV.

EXAMPLES 10-17

A roll of anti-blocking barrier material was prepared to determine whether the anti-blocking layer could be successfully applied at speeds above 500 fpm.

A 180 cell count reverse gravure roll on a C&L coater was used to apply a 45 weight % NV PVDC 8730 emulsion (including about 3% isopropyl alcohol). The barrier layer on the polyethylene terephthalate substrate was then dried in a 60 foot Ross dryer maintained at an air temperature of about 215° F. The resulting barrier layer was present in an amount of 1.1 lb/ream on a dry/dry basis.

The anti-blocking layer composition was then applied to the barrier layer using a 280 cell count gravure roll. The composition included about 15 wet weight % NV PVdC, about 2 wet weight % Michemlube 160 wax (based on the wet weight of the coating), about 2% Ludox TM-50 colloidal silica (based on the wet weight of the coating), and about 3 wet weight % isopropyl alcohol. The composite was then dried in a Ross dryer maintained at a temperature of about 215° F. The anti-blocking layer was present in an amount of about 0.2 lb/ream of substrate on a dry/dry basis.

The roll was initially prepared at about 500 fpm. The line speed was increased to about 600 fpm after a few minutes and the dryer temperature was increased by about 2-3° F. The fan pressure was maintained at about 1-2 in. H$_2$O. Then, in increments of about 100 fpm, the line speed was increased to about 1,400 fpm and the dryer temperature was correspondingly increased to properly dry the layers of coating. At about 1,400 fpm the coat weight was about 1.07 lb/ream. The anti-blocking barrier composite was successfully prepared.

The resulting composites were then evaluated. The results are presented in Table 4.

TABLE 4

| Example | PVdC NV in barrier layer (B)/anti-blocking layer (AB) | PVdC Ct Wt (B)/ (B + AB) (lb/ream) | Line Speed (fpm) | WVTR (B)/ (B + AB) (g/100 in$^2$/ 24 hrs) | OTR (B)/ (B + AB) (cc O$_2$/100 in$^2$/24 hrs) | Results |
|---|---|---|---|---|---|---|
| 10 | 45% B 15% AB | — 2.01 | 500 | | | No blocking |
| 11 | 45% B 15% AB | 1.23 1.42 | 500 | 0.426/ 0.398 | 0.416/ 0.403 | No blocking |

TABLE 4-continued

| Example | PVdC NV in barrier layer (B)/anti-blocking layer (AB) | PVdC Ct Wt (B)/ (B + AB) (lb/ream) | | Line Speed (fpm) | WVTR (B)/ (B + AB) (g/100 in²/ 24 hrs) | OTR (B)/ (B + AB) (cc O₂/100 in²/24 hrs) | Results |
|---|---|---|---|---|---|---|---|
| 12 | 45% B 15% AB | 1.48 | 1.73 | 500 | 0.436/ 0.362 | 0.417/ 0.422* | No blocking |
| 13 | 45% B 15% AB | — | 1.30 | 500 | —/ 0.455 | —/0.451 | No blocking |
| 14 | 45% B 15% AB | 1.2 | 1.37 | 500 | — | — | No blocking |
| 15 | 53% B 15% AB | 1.38 | 1.42 | 500 | — | — | No blocking |
| 16 | 53% B 15% AB | — | 1.07 | 500-1,400 | —/ 0.569 | —/0.619 | No blocking |
| 17 | 53% B 15% AB | 1.38 | 1.417 | 500 | 0.503/ 0.473 | 0.476/ 0.444 | No blocking |

*It is unclear why this Example did not perform as expected.

As is evident from the data presented above, the process described herein and in accordance with the present invention can be successfully used to prepare composites that have anti-blocking barrier characteristics. Notably, greater line speeds can be achieved with the composite of the present invention than can be achieved with the barrier layer coated substrate alone. The anti-blocking layer sufficiently overcomes any effect caused by residual moisture not adequately removed at greater processing speeds. This is an unexpected result, as even low levels of moisture can adversely impact blocking.

Additionally, as evidenced by the WVTR and OTR, where PVdC is used to form the anti-blocking layer, the PVdC in the anti-blocking layer contributes to the overall barrier properties of the composite.

Further, it should be noted that the barrier properties are not adversely affected by diluting the PVdC to about 45 weight % with water and 3 weight % isopropyl alcohol. There were no flaws in the PVdC 8730 coating, except for a fine scale orange-peel.

EXAMPLE 18

A lower concentration of PVdC in the anti-blocking coating was evaluated. First, a layer of 36% DARAN 8730 was applied to the PVdC substrate using a #8 Mayer rod, followed by "light" drying for about 1 minute at about 40° C. Then, about 1 lb/ream of the anti-blocking coating containing 13% 8730 PVdC, 2% wet weight Michemlube 160, and 2% Ludox TM-50 was successfully applied to the barrier layer and dried for about 1 minute at about 40° C. The OTR value of the composite was 0.24 cc/day/100 sq. in.

EXAMPLE 19

The ability to effectively seal composites formed according to the present invention was evaluated. A sample was formed according to the procedure provided in Examples 10-17. The sample included 1.2 lb dry PVdC/ream dry substrate for the barrier layer and 0.2 lb dry PVdC/ream dry substrate for the anti-blocking layer. Colloidal silica and Carnauba wax were also provided in the anti-blocking layer according to Examples 10-17.

The resulting composite was cut into samples about 5 in. by about 11 in. The samples were folded in half to form a "sandwich" with the anti-blocking layers in contact. Next, the sample was placed in a laboratory heat sealer consisting of two metal bars containing heating coils therein. One bar is suspended on levers so that the entire length of the bar (about 10 in.) may be clamped forcefully against the lower, stationary bar.

At a gauge pressure of about 60 psi, and a dwell time of about 0.25 seconds, a heat seal was successfully formed at temperatures from about 260° F. from about 325° F. The heat seals were so strong that the composite tore instead of peeling at the heat seal joining line. Thus, if required by a particular application, the composites of the present invention are suitable for use in food packaging materials and processes.

Accordingly, it will be readily understood by those persons skilled in the art that, in view of the above detailed description of the invention, the present invention is susceptible of broad utility and application. Many methods, embodiments, and adaptations of the present invention other than those herein described, as well as many variations, modifications, and equivalent arrangements will be apparent from or reasonably suggested by the present invention and the above detailed description thereof, without departing from the substance or scope of the present invention. Accordingly, while the present invention is described herein in detail in relation to specific aspects, it is to be understood that this detailed description is only illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications, and equivalent arrangements of the present invention, the present invention being limited solely by the claims appended hereto and the equivalents thereof.

What is claimed is:

1. A barrier composite comprising:
   a) a substrate:
   b) a barrier layer comprising polyvinylidene chloride disposed on the substrate; and
   c) an outermost layer comprising an anti-blocking layer disposed on the barrier layer, wherein the anti-blocking layer consists essentially of polyvinyl alcohol.

2. The composite of claim 1, wherein the ratio of the weight of the anti-blocking layer to the weight of the barrier layer is from about 0.1 to about 0.4 on a dry/dry per unit area basis.

3. The composite of claim 1, wherein the ratio of the weight of the anti-blocking layer to the weight of the barrier layer is from about 0.2 to about 0.3 on a dry/dry per unit area basis.

4. The composite of claim 1, wherein the ratio of the weight of the anti-blocking layer to the weight of the barrier layer is about 0.25 on a dry/dry per unit area basis.

5. The composite of claim 1, wherein the ratio of the weight of the barrier layer to the weight of the substrate is from about 0.1 to about 0.4 on a dry/dry per unit area basis.

6. The composite of claim 1, wherein the ratio of the weight of the barrier layer to the weight of the substrate is from about 0.2 to about 0.4 on a dry/dry per unit area basis.

7. The composite of claim 1, wherein the ratio of the weight of the barrier layer to the weight of the substrate is about 0.25 on a dry/dry per unit area basis.

8. The composite of claim 1, wherein the substrate comprises a coated paper, an uncoated paper, a polymer film, or any combination thereof.

9. The composite of claim 1, wherein the substrate comprises polyethylene terephthalate film.

10. The composite of claim 9, wherein the polyethylene terephthalate film has a thickness of about 0.0005 in.

* * * * *